United States Patent [19]

Helfer et al.

[11] 4,295,348
[45] Oct. 20, 1981

[54] PROGRESSIVE TORQUE TRANSMISSION IN LEAF-SPRING COUPLING

[75] Inventors: Friedrich Helfer, Königsbronn-Zang; Ernst Elsner, Herbrechtingen; Wolfgang Zaiser, Steinheim, all of Fed. Rep. of Germany

[73] Assignee: Voith Getriebe KG., Fed. Rep. of Germany

[21] Appl. No.: 69,373

[22] Filed: Aug. 24, 1979

[30] Foreign Application Priority Data

Jan. 19, 1979 [DE] Fed. Rep. of Germany ....... 2901933

[51] Int. Cl.³ .............................................. F16D 3/56
[52] U.S. Cl. ..................... 64/27 L; 64/15 B; 403/291; 192/106.1
[58] Field of Search .............. 403/291; 192/106.1; 64/27 R, 27 B, 27 L, 15 B

[56] References Cited

U.S. PATENT DOCUMENTS

| 1,328,366 | 1/1920 | Brown | 64/15 B |
| 1,937,502 | 12/1933 | Anger | 64/27 B |
| 1,990,683 | 2/1935 | Wood | 192/106.1 |

FOREIGN PATENT DOCUMENTS

| 212649 | 12/1960 | Austria | 64/15 B |
| 555438 | 7/1932 | Fed. Rep. of Germany | |
| 849501 | 9/1952 | Fed. Rep. of Germany | 64/15 B |
| 931497 | 7/1963 | United Kingdom | 64/27 R |
| 310066 | 9/1971 | U.S.S.R. | 64/27 L |

Primary Examiner—James Kee Chi
Attorney, Agent, or Firm—Ostrolenk, Faber, Gerb & Soffen

[57] ABSTRACT

The disclosure concerns a leaf-spring coupling comprising a hub and an outer ring around the hub and a plurality of leaf-spring assemblies clamped to the hub and extending into respective receiving grooves in the outer ring, such that relative rotation around the axis of the hub and the outer ring flexes the leaf-spring assemblies. Each leaf-spring assembly is comprised of a plurality of leaf-springs, including a longer principal spring that continuously engages in the groove in the outer ring and a plurality of flank springs next to the principal spring and which decrease in length stepwise moving out from the principal spring. A series of stops are arranged in the groove for each leaf-spring assembly. Each flank spring engages its respective stop as the hub and outer ring rotate relatively to each other and such engagement causes the respective leaf-spring to flex toward the principal spring. In all embodiments, prior to flexion, the leaf-springs are apart from the stops and they engage the stops upon relative rotation of the hub and the outer ring. In some embodiments, the stops are so placed that the individual flank springs engage their respective stops consecutively as the relative rotation of the hub and outer ring increases.

29 Claims, 13 Drawing Figures

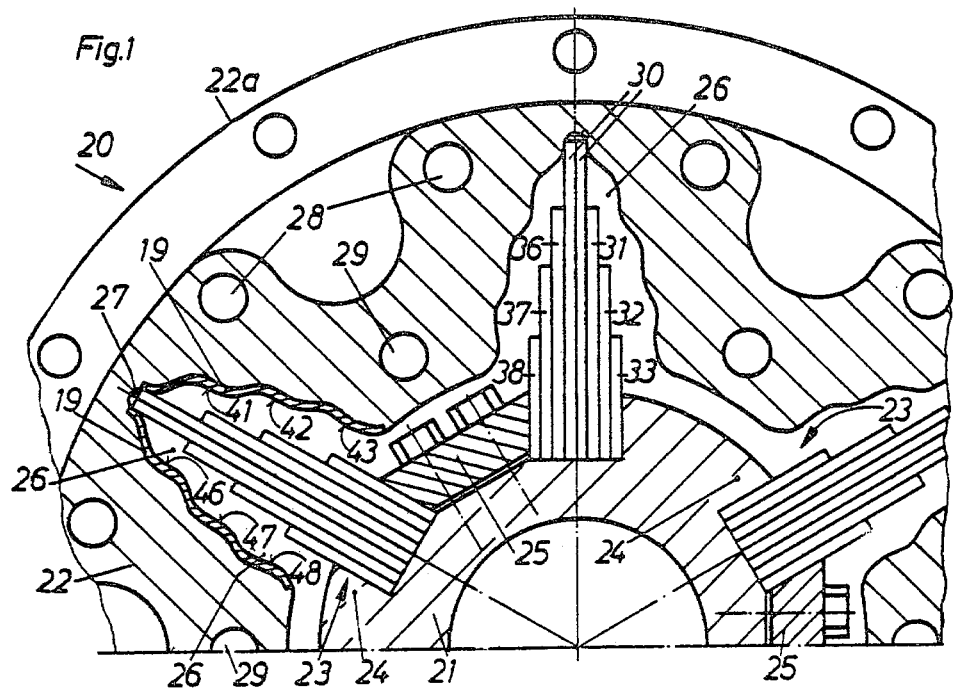
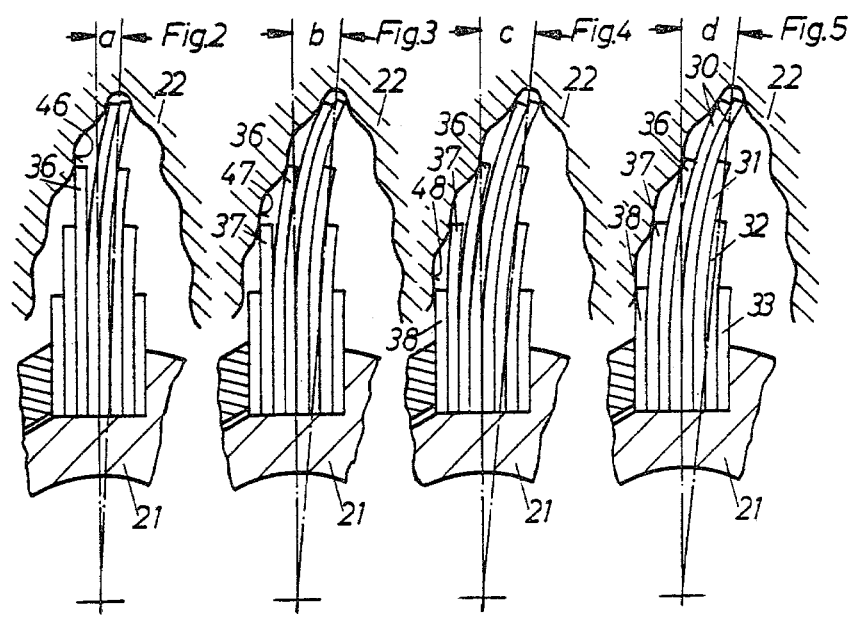

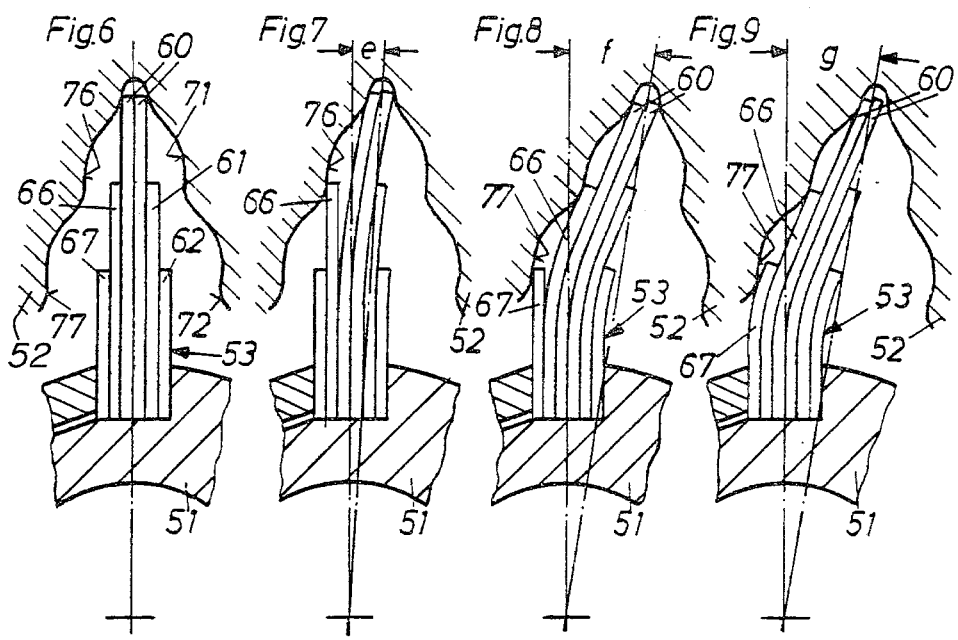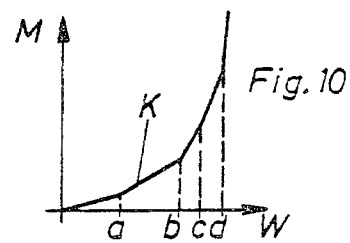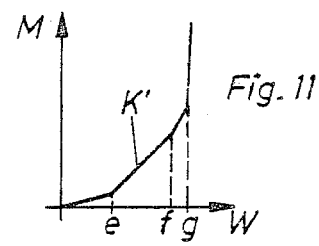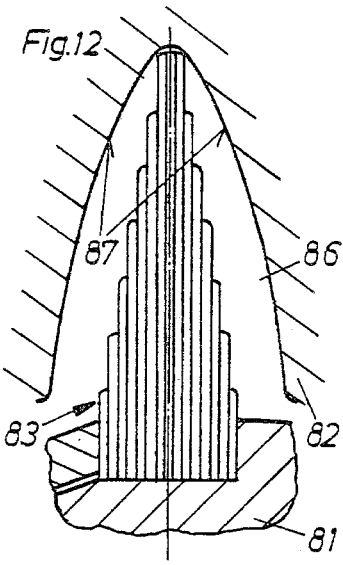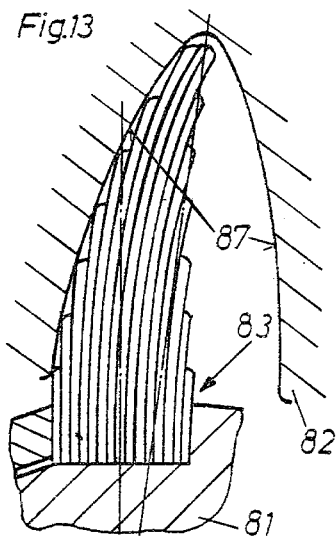

PROGRESSIVE TORQUE TRANSMISSION IN LEAF-SPRING COUPLING

BACKGROUND OF THE INVENTION

The present invention relates to a leaf-spring coupling, and particularly one that is torsionally elastic. Such couplings comprise an inner coupling part or hub, an outer coupling or ring, and radially extending leaf-spring assemblies that elastically join the inner and outer coupling parts. Upon relative motion or turning between the two coupling parts, the leaf-spring assemblies are stressed.

In one known coupling of this type, shown in Kupplungs-Atlas, 1975, pages 41 to 40, A.G.T.-Verlag Georg Thumm, Ludwigsburg, the leaf-spring assemblies are clamped to the outer ring using intermediate pieces which extend between the leaf-spring assemblies in the direction toward the hub. The radially inner ends of the intermediate pieces have stop surfaces, which, at the maximum angle of intended turn in each case, strike against those leaf springs which engage into the hub, and therefore against the so-called principal springs. The end stop thus formed is hard, and the principal springs thereby have extensive shear stress applied to them. Accordingly, there is the danger that the principal springs may break under strong torsional blows.

Up to the end stop, the torsional stiffness of the known coupling is constant, i.e. its torsion characteristic increases linearly. Frequently, however, it is necessary for the torsional stiffness of the coupling to increase progressively as the angle of turn increases. For this purpose, there is a known coupling in which only a few of the leaf-spring assemblies that project from one of the coupling parts continuously engage the other coupling part. The other leaf-spring assemblies engage that other coupling part only after a given angle of twist between the coupling parts. In this way, a torsion characteristic is produced which has two linear regions of different pitch. This torsion characteristic already approaches a progressive characteristic and can be referred to as a "graded progressive characteristic." The grading, however, is still very coarse. Vibrational problems can result. Furthermore, it is unsatisfactory that a few leaf-spring assemblies participate only part of the time in the transmission of the torque. The other leaf-spring assemblies have no effect at an angle of turn below the angle of turn at which they initially engage.

SUMMARY OF THE INVENTION

The primary object of the present invention is to develop the aforementioned known leaf-spring coupling in such a manner that its torsion characteristic approaches a continuously progressive course.

Another object of the invention is to obtain uniform utilization of the leaf-spring assemblies.

According to the invention, each leaf-spring assembly comprises a package of leaf springs of different lengths, with the lengths of the springs gradually decreasing outwardly from the longest principal spring. Each assembly of springs is attached to a first coupling part, i.e. the hub or an annular ring about the hub. The spring assembly engages the other, second coupling part, for instance, in a recess provided therein. Preferably, the longest or principal springs continuously engage the second coupling part. The second coupling part has sets of stops formed, for example, in respective recesses in the second coupling part, one recess for each spring assembly. After each given angle of turn, the stops engage at least part of the flank springs. In one of the embodiments, the flank springs are engaged in sequence, each after an increasing angle of turn. As the lengths of the flank springs progressively decrease, this may have the effect of reducing the radius of the force applied to each entire spring assembly. The stops may transmit torque in only one of the two opposite circumferential directions of relative rotation of the coupling parts or in both opposite directions.

In known leaf-spring couplings, upon transmission of power in the one circumferential direction, only the so-called front or leading flank springs in the direction of power transmission are used for the transmission of power. They are the support or principal springs. An example of such a coupling can be seen from copending U.S. application, Ser. No. 69,372, filed of even data herewith by Wolfgang Zaisner and Ernst Elsner, entitled "Securement of Leaf-Spring In Torsionally Elastic Coupling." The so-called rear flank or trailing springs remain without lead. (For this reason, in some known leaf-spring couplings, the rear flank springs are omitted in whole or in part.) The leaf-spring coupling of the invention enables at least a part of the rear flank springs to additionally be used for the transmission of power. The rear flank springs cooperate with stops of the other coupling half when a given angle of turn is exceeded. Depending upon the fineness of the grading of the flank springs, a more or less finely graded progressive torsion characteristic is obtained and a relatively soft end stop is secured. Thus, high shear stressing of the principal springs can be avoided. Furthermore, due to the combined action of the rear flank springs and because all spring assemblies participate in the transmission of the force, even with small angles of turn, the fullest utilization of the leaf springs is obtained. In this way, for a given maximum torque, either the coupling can be made smaller than heretofore or the number of leaf spring assemblies can be reduced.

The larger is the number of flank springs with which a stop is associated, the higher is the degree of utilization of the leaf-springs as a whole. In addition, the torsional stiffness of the coupling can be increased in particularly fine steps as the angle of relative rotation of the coupling parts becomes greater. In different embodiments, a more or less rapidly rising torsion characteristic can be provided using identical leaf-springs. As noted above, as the angle of relative rotation becomes greater, upon the engagement of the rear flank leaf-springs, the radius of action of the force becomes increasingly smaller. Contrary to this, in another embodiment, the entry into engagement of the flank springs takes place at relatively short distances apart of relative rotation. In this way, the rear flank springs initially act as individual springs i.e. they do not come into contact with the rest of the respective spring assembly. Upon further relative rotation, the individual flank springs are pressed against the preceding previously flexed springs. In this connection, and even when all leaf springs are applied against each other at the maximum angle of relative rotation, the stop surfaces are more uniformly loaded than in the other embodiment so that less wear is to be expected.

By varying the thickness of the spring plate of each leaf-spring in the direction of rotation, the torsion characteristic of the coupling can be influenced. This thickness variation can be done among the individual springs of one spring assembly. Here, the shorter a spring is, the thicker is also might be. The result can be obtained that the some flexural stress occurs in the clamping region of all springs. Furthermore, the stops can be so arranged that a circular line of bend is imposed on the individual leaf-spring assemblies as a whole. In this way, the result can be obtained that the same flexural stresses prevail at least approximately in all regions of the leaf-spring assembly.

In the coupling of the invention, the leaf-spring packages can be clamped either in the outer ring (as known from the aforementioned "Kupplungsatlas") or in the hub (as known from German Pat. No. 555,438). However, the latter arrangement is more advantageous because the stops are formed of segment-shaped parts of the outer ring which extend for this purpose radially inwardly into the regions between the leaf-spring assemblies.

If the coupling has side discs, for enabling the inside of the coupling to be filled with lubricant, the side discs can be fastened, in addition, to the segment-shaped parts of the outer ring and not only to its outer periphery. In this case, additional fastening means, e.g., screws, can be arranged relatively close to the hub, as is known from the "Kupplungsatlas". As a result, when liquid filling is provided, the stressing of the side discs, which occurs as a result of the pressure of the liquid, can be better controlled.

As another advantage of the invention, when a reduced number of leaf-spring assemblies is used, and when they are clamped to the hub, space is obtained at the hub for a particularly strong development of the clamping elements. See the above described U.S. application Ser. No. 69,372, entitled "Securement of Leaf-Springs In Torsionally Elastic Coupling".

Other objects and features of the invention are apparent from the illustrative embodiments of the invention which are described below with reference to the accompanying drawings.

BRIEF DESCRIPTION OF THE DRAWINGS

FIG. 1 is a partial cross-sectional view through a leaf-spring coupling according to the invention;

FIGS. 2 to 5 show a leaf-spring assembly of the coupling of FIG. 1 at various angles of relative rotation of the coupling parts;

FIGS. 6 to 9 show a leaf-spring assembly of another embodiment of a coupling, also at various angles of relative rotation;

FIG. 10 graphs the torsion characteristic of the coupling of FIGS. 1 to 5;

FIG. 11 graphs the torsion characteristic of the coupling of FIGS. 6 to 9; and

FIGS. 12 and 13 show a leaf-spring assembly of a third embodiment of a coupling according to the invention in a condition without load and in a condition with maximum load, respectively.

DESCRIPTION OF PREFERRED EMBODIMENTS

The torsionally elastic or leaf-spring coupling 20 in FIG. 1 is comprised of a hub 21, which serves as an inner coupling part, and an outer ring 22, which serves as an outer coupling part. The outer ring 22 has an attachment flange 22a at its periphery. Several leaf-spring assemblies 23 are clamped to the hub 21. Each extends radially outwardly into a respective, radially aligned recess 26 extending into the outer ring 22. For clamping of leaf-spring assemblies 23 to the hub 21, wedge-shaped intermediate pieces 24 and 25 are provided. They taper narrower toward the axis of the coupling. In this connection, fixed intermediate pieces 24 are formed on and as part of the hub, while loose intermediate pieces 25 are screwed to the hub. The intermediate pieces 24 and 25 alternate with each other around the circumferential direction of the hub 21. See aforesaid U.S. application Ser. No. 69,372, "Securement of Leaf-Springs in Torsionally Elastic Coupling." This provides a simple, space-saving, but nevertheless reliable attachment of the leaf-spring assemblies 23 to the hub 21.

Each of the leaf-spring assemblies 23 is comprised of leaf-springs of different length, whereby each defines a body of homogeneous flexural stress. The longest leaf springs 30 of each assembly, also known as the principal springs, are arranged, in a preferably symmetrical arrangement of the leaf springs, in the center of the leaf-spring assembly. One at least one side, but preferably on both sides of the longest leaf-spring, there are pluralities of flank springs 31, 32, 33 on one side and 36, 37, 38 on the other side, whose lengths decreases stepwise away from the principal springs 30. Although the springs are of uniform thickness in the direction of relative rotation of the coupling parts, they may also be of varying thickness, with the shorter flank springs being thicker.

The recesses 26 provided in the outer ring 22, are formed as follows. In their radially outermost region, they form grooves 27 that extend parallel to the axis. The circumferential width of each groove is only slightly greater than the total thickness in the circumferential direction of the two principal springs 30. Thus, the principal springs 30 are continuously in engagement with the side walls of the grooves 27 at the outer coupling half. A minimal clearance between the principal springs 30 and the grooved side surfaces, coupled with the rounded shapes of the grooved side surfaces prevent jamming of the leaf springs when the two coupling parts 21 and 22 rotate with respect to each other.

Each of the flank springs 31, 32, 33 and 36, 37, 38 has a respectively step means, i.e. a stop surface in the recess 26 associated with it. The stop surfaces bear reference numbers which are greater by ten than the number of the respective leaf-spring. The transitions between these stop surfaces and from the stop surfaces to the groove 27 are rounded, so that the side walls of the entire recess 26 are undulating.

FIG. 1 shows the coupling in the condition without load and therefore with a relative angle of rotation of zero. FIGS. 2 to 5 show one of the leaf-spring assemblies 23 at different operating conditions of the coupling. For understanding these Figures, it is assumed that the position of the hub 21 remains unchanged and that the outer ring 22 is being turned clock-wise. The front flank on the right hand side in FIG. 2, comprised of springs 31, 32, 33, always rest against the principal springs 30 and support them, particularly as the springs 30 flex toward those front flank springs.

FIG. 2 shows an angle of turn a. The stop 46 of the outer ring 22 has come into contact with the longest of the rear flank springs 36. In FIG. 3, upon the larger angle of turn b, the stop 47 has come into contact with the spring 37. In FIG. 4, upon the even larger angle of turn c, the stop 48 has come into contact with the spring 38. In FIG. 5 the angle of turn has finally increased to the value d. In this position, the rear flank springs 36, 37 and 38 have come to rest against each other and against the principal springs 30, and these springs act as end stop. Of course, this is not a rigid end stop because the coupling still has slight elasticity, even in this condition. With a smaller angle of turn d the springs 36, 37 and 38 act as individual springs, as shown particularly by FIG. 4.

It is obvious that the power transmission shown in FIGS. 2 to 5 can also take place in the other circumferential direction. In such case the leaf-springs 36, 37, 38 perform the function of the front flank springs and the leaf springs 31, 32, 33 perform the function of the rear flank springs.

Returning to FIG. 1, side discs (not shown) can be fastened in known manner to the outer ring 22. The screws which are required for fastening the side discs are received in bore holes 29 that are provided in the radially inner region of the outer ring 22 and in bore holes 28 that are arranged in the radially outer region of the ring 22.

The side surfaces of the groove 27 and of the stop surfaces 41, 42, 43 ad 46, 47, 48 may be covered with a metal sheet reinforcement that protects the surfaces against wear.

A second embodiment of coupling is shown in FIGS. 6 to 9. There is a hub 51 and an outer ring 52. One of the sheet metal spring assemblies 53 is illustrated. It includes central, principal springs 60, the front flank springs 61 and 62, as seen in the direction of the flow of power, and the rear flank springs 66 and 67. Stop means, i.e. stop surfaces 71, 72, 76, 77 on the outer ring 52 are associated with the respective flank springs. The circumferentially measured distance between the corresponding stop surfaces 71 and 76 and also 72 and 77 is greater than the circumferential distances between the corresponding stop surfaces in FIGS. 1 to 5. The following result is obtained.

After the angle of turn e (FIG. 7), the first rear flank spring 66 contacts it stop surface 76. Upon continued turning, the spring 66 is forced to lie against the principal springs 60. This occurs at the latest when the next spring 67 comes into engagement with its stop 77, at the larger angle of turn f (FIG. 8). Upon further rotation to the angle of turn g (FIG. 9), the spring 67 is also caused to rest against the rest of the spring assembly. This arrangement could, of course, also be used in the case of a spring assembly having a larger number of flank springs, i.e. a more finely subdivided spring assembly. As the angle of turn becomes larger, as each of the flank springs 66, 67 in its turn engages its stop, then as a result of such engagements, the radius of attack of the force of the ring 52 on the spring assembly 53 becomes increasingly smaller, because the radius of each successive stop is progressively smaller. At the same time, the thickness of the part of the spring assembly then present in the block state increases stepwise. This means that with the maximum angle of turn (see FIG. 9), the stop 77 associated with the shortest spring 67 transmits substantially the entire circumferential force to the spring assembly 53, while the ends of the other springs 66 and 60 are substantially free of circumferential force. This can be noted in FIG. 9 also from the fact that the spring assembly is no longer curved above the stop 77 which lies furthest towards the inside.

FIG. 10 graphs the torsion characteristic K of the coupling 20 of FIGS. 1 to 5. In this diagram, the torque M which can be transmitted by the coupling is plotted against the angle of turn or relative rotation W. As is already evident from the above explanations of FIGS. 2 to 5, the torsional stiffness of the coupling increases progressively at the angles of turn a, b, c and d. This is expressed in FIG. 10 by the increase in slope of the torsion characteristic. In the same manner, FIG. 11 shows the torsion characteristic K' for the coupling embodiment of FIGS. 6 to 9. The generally steeper course of the latter torsion characteristic can be clearly noted.

FIGS. 12 and 13 show another embodiment of the invention. It includes the hub 81, the outer ring 82, and one of the leaf-spring assemblies 83. A recess 86 is provided in the outer ring 82 for receiving the springs of the assembly 83. The limitation of the recess 86 is formed by stop means in the form of continuously curved surfaces 87, in contrast to the stepped stop means surfaces of the previous embodiments. The ends of the springs of the leaf-spring assembly 83 which come into engagement with the surfaces 87 are rounded. FIG. 12 shows the condition of rest of this coupling, while FIG. 13 shows its condition at the maximum angle of turn.

In all illustrated embodiments, the leaf-spring assemblies and the recesses with the stop surfaces are formed symmetrically in order to obtain the same action of the coupling in both directions of flow of power. It is obvious, however, that asymmmetrical shapes of the leaf-spring assemblies and/or of the recesses arranged in the outer ring can be provided if the increase in the torsional stiffness of the coupling is to be different in the two directions of the flow of power.

Although the present invention has been described in connection with the preferred embodiments thereof, many variations and modifications will now become apparent to those skilled in the art. It is preferred, therefore, that the present invention be limited not by the specific disclosure herein, but only by the appended claims.

What is claimed is:
1. A leaf-spring coupling comprising:
 a first coupling part and a second coupling part spaced from said first coupling part;
 a plurality of leaf-spring assemblies extending between and coupling said first and said second coupling parts in an elastic manner; each said leaf-spring assembly comprising a plurality of leaf-springs oriented to extend between said first and said second coupling parts, and said leaf-springs of each said assembly being of different lengths, including a longer principal spring and a plurality of flank springs arrayed next to at least one side of said principal spring, wherein the lengths of said flank springs decrease stepwise from spring to spring away from said one side of said principal spring;
 said leaf-spring assemblies being clamped to said first clamping part;
 said second coupling part including respective stop means for each said assembly which are spaced from said flank springs of that said assembly and are so located with respect to said flank springs that upon relative motion of said first and said second coupling parts in a direction laterally of said leaf-springs, said principal spring engaging said second coupling part and being stressed and flexed by such engagement in a direction away from said flank springs at said one side of said principal springs and said stop means also engaging at least a part of at least some of said flank springs also at said one side, thereby increasing the number of said leaf-springs in a said assembly which are stressed.

2. The leaf-spring coupling of claim 1, wherein said stop means comprise a respective said stop for each said flank spring at said one side.

3. The leaf-spring coupling of claim 2, wherein said stops are so placed with respect to the respective said flank springs that progressively more of said stops engage their respective said flank springs as the relative movement of said coupling parts in said one direction becomes greater.

4. The leaf-spring coupling of either of claims 1 or 2, wherein for defining and containing each said stop means, a respective said recess is formed in said second coupling part and said stop means being formed in the respective said recesses; said springs of each said assembly extend into the respective said recess.

5. Leaf-spring coupling for coupling a hub formed around an axis with an outer ring formed around said hub and radially spaced from said hub; said hub and said outer ring each respectively comprising one of two coupling parts of said coupling;

a plurality of leaf-spring assemblies extending between and coupling said hub and said outer ring in a torsionally elastic manner; each said leaf spring assembly comprising a plurality of leaf-springs oriented to extend radially between said hub and said outer ring; said leaf-springs of each said assembly being of different radial lengths, including a longer principal spring and a plurality of flank springs arrrayed next to at least one side of said principal spring, wherein the lengths of said flank springs decrease stepwise from spring to spring away from said one side of said principal spring;

said leaf-spring assemblies being clamped to one of said coupling parts;

said other coupling part including respective stop means for each said assembly and which are spaced from said flank springs of that said assembly and are so located with respect to said flank springs that upon a given angle of turn of said hub and said outer ring relative to each other around said axis, said principal spring engaging said second coupling part and being stressed and flexed by such engagement in a direction away from said flank springs at said one said of said principal springs and said stop means also engaging at least a part of at least some of said flank springs also at said one side, thereby increasing the number of said leaf-springs in a said assembly which are stressed.

6. The leaf-spring assembly of claim 5, wherein there are said flank springs of stepwise decreasing length on both opposite sides of said principal spring.

7. The leaf-spring assembly of claim 5, wherein said stop means comprise a respective said stop for each said flank spring.

8. The leaf-spring assembly of either of claims 5 or 7, wherein for each said stop means, a respective recess is formed in said other coupling part and said stop means being formed in the respective said recesses; said springs of each said assembly extending into the respective said recess.

9. The leaf-spring coupling of claim 7, wherein said stops are so placed with respect to the respective said flank springs that progressively more of said stops engage their respective said flank springs as the relative movement of said hub and said outer ring in said one direction becomes greater.

10. The leaf-spring coupling of any one of the claims 5, 7 or 9, wherein said stop means are positioned for transmitting torque to said leaf-springs upon relative rotation of said hub and said outer ring in only one of two opposite circumferential directions.

11. The leaf-spring coupling of any one of the claims 5, 6, 7, or 9, wherein said stop means are positioned for transmitting torque to said leaf-spring upon relative rotation of said hub and said outer ring in either of the two opposite circumferential directions.

12. The leaf-spring coupling of either of claims 7 or 9, wherein said stops are so placed that they progressively engage each said flank spring, in turn, out from said one side of said principal spring, and each said stop delays engaging its respective said flank spring until after the preceding flank spring has been flexed away from the respective said flank spring, such that each said flank spring, upon being engaged by its respective said stop, acts as an individual spring; and following further relative rotation of said hub and said outer ring, the respective said flank spring is pressed by its said stop against the preceding said flank spring and said principal spring.

13. The leaf-spring coupling of claim 12, wherein said stops for each said assembly are arranged and placed so that the line of bend of said springs of said assembly are approximately circular arcs.

14. The leaf-spring coupling of claim 12, wherein said stops are so placed that the respective said flank spring is not engaged by its said stop until after the preceding said flank spring has been flexed to lie against the said spring next preceding said preceding spring.

15. The leaf-spring coupling of claim 14, wherein said stops for each said assembly are arranged and placed so that the line of bend of said springs of said assembly are approximately circular arcs.

16. The leaf-spring coupling of any one of the claims 5, 6 or 9, wherein said leaf-springs of the individual said assemblies are of different thicknesses in the circumferential direction around said axis.

17. The leaf-spring coupling of claim 16, wherein in said individual assembly, the thickness of said leaf-springs increases as said leaf-springs are shorter.

18. The leaf-spring coupling of claim 7, wherein said stops for each said assembly are arranged and placed so that the line of bend of said springs of said assembly are approximately circular arcs.

19. The leaf-spring coupling of any one of the claims 5, 6, 7 or 18, wherein said stop means are defined by a continuously curving surface supported by the respective said coupling part having said stop means therein.

20. The leaf-spring coupling of claim 19, wherein said leaf-springs have ends engageable with said curving surface and said engageable ends of said leaf-springs being rounded.

21. The leaf-spring coupling of claim 19, wherein for each said stop means, a respective said groove is formed in said other coupling part and said stop means being formed in the respective said grooves; said springs of each said assembly extend into the respective said groove.

22. The leaf-spring coupling of either of claims 5 or 6, wherein said assemblies are clamped to said hub and said principal springs of said assemblies engage with said outer ring.

23. The leaf-spring coupling of claim 22 further comprising, said clamping of said assemblies to said hub comprising wedge-shaped intermediate pieces being positioned between adjacent said leaf-spring assemblies;

said leaf-spring assemblies having opposite circumferential sides which face generally toward the adjacent said leaf-spring assembly; each said intermediate piece having opposite tapered side walls which face toward the opposed said opposite sides of the adjacent said leaf-spring assemblies between which said intermediate piece is positioned;

said wedged-shaped intermediate pieces being held to said hub and said wedge-shaped intermediate pieces also serving as means for fastening said leaf-spring assemblies to said hub.

24. The leaf-spring coupling of claim 23, wherein at least a first plurality of said wedge-shaped intermediate pieces are separate from and are fastened to said hub; fastening means for fastening said first plurality of intermediate pieces to said hub.

25. The leaf-spring coupling of claim 24, wherein a second plurality of said wedge-shaped intermediate pieces are interspersed around said hub among said first plurality of said intermediate pieces; said second plurality of intermediate pieces being integrally formed with said hub and projecting toward said outer ring from said hub.

26. The leaf-spring coupling of claim 25, wherein each alternate said intermediate piece is of said first plurality and the next adjacent said intermediate piece is of said second plurality.

27. The leaf-spring coupling of claim 25, wherein for each said stop means, a respective said groove is formed in the other said coupling part and said stop means being formed in the respective said grooves; said springs of each said assembly extend into the respective said groove.

28. The leaf-spring coupling of either of claims 1 or 5, wherein each said stop means directly engages the said springs which it is engaging.

29. Leaf-spring coupling for coupling a hub formed around an axis with an outer ring formed around said hub and radially spaced from said hub; said hub and said outer ring each respectively comprising one of two coupling parts of said coupling;

a plurality of leaf-spring assemblies extending between and coupling said hub and said outer ring in a torsionally elastic manner; each said leaf spring assembly comprising a plurality of leaf-springs oriented to extend radially between said hub and said outer ring; said leaf-springs of each said assembly being of different radial lengths, including a longer principal spring and at least one flank spring arrayed next to at least one side of said principal spring, wherein the length of said flank spring is less than the length of said principal spring;

said leaf-spring assemblies being clamped to one of said coupling parts;

said other coupling part including respective stop means for each said assembly and which are spaced from said at least one flank spring of that said assembly and are so located with respect to said flank spring that upon a given angle of turn of said hub and said outer ring relative to each other around said axis, said principal spring engaging said second coupling part and being stressed and flexed by such engagement in a direction away from said flank spring at said one side of said principal spring and said stop means also engaging at least a part of said flank spring also at said one side, thereby increasing the number of said leaf-springs in a said assembly which are stressed.

* * * * *